Oct. 2, 1934.   O. P. GRUBE   1,975,419
AUTOMATIC ELECTRIC EXTENSION LIGHT
Filed May 3, 1930   4 Sheets-Sheet 2
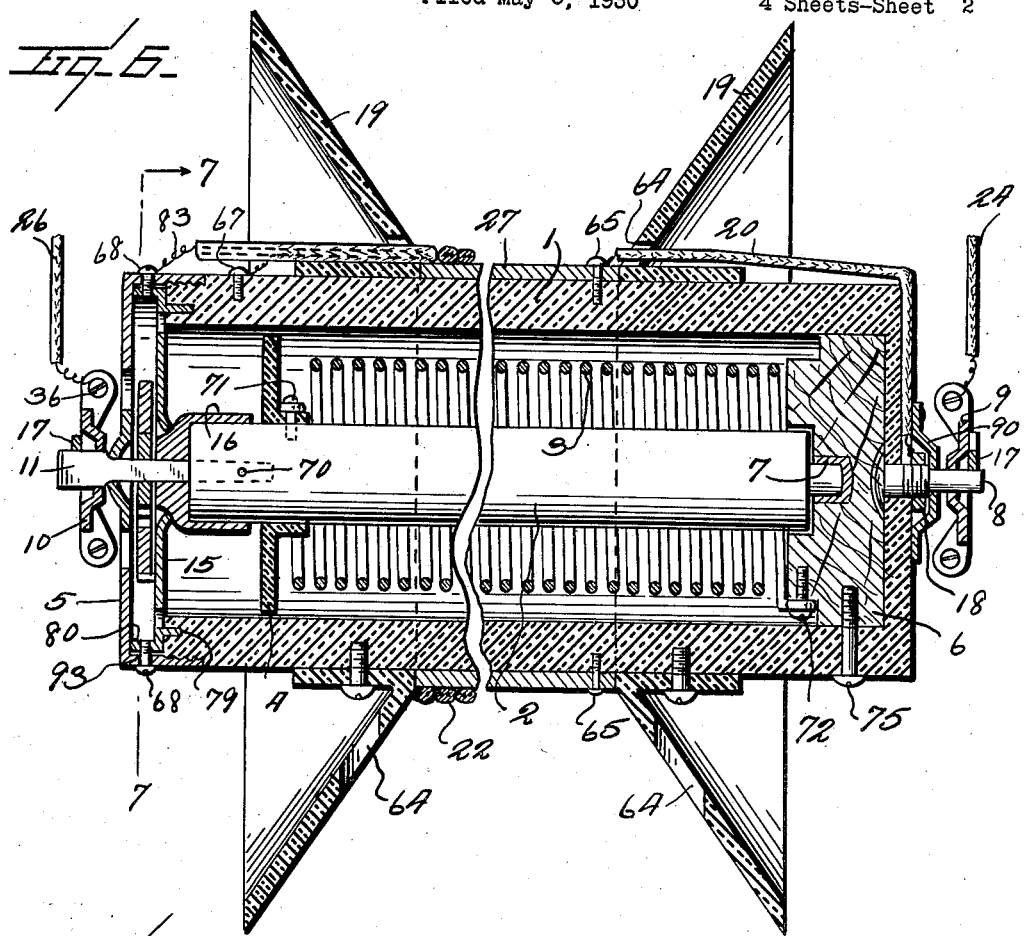
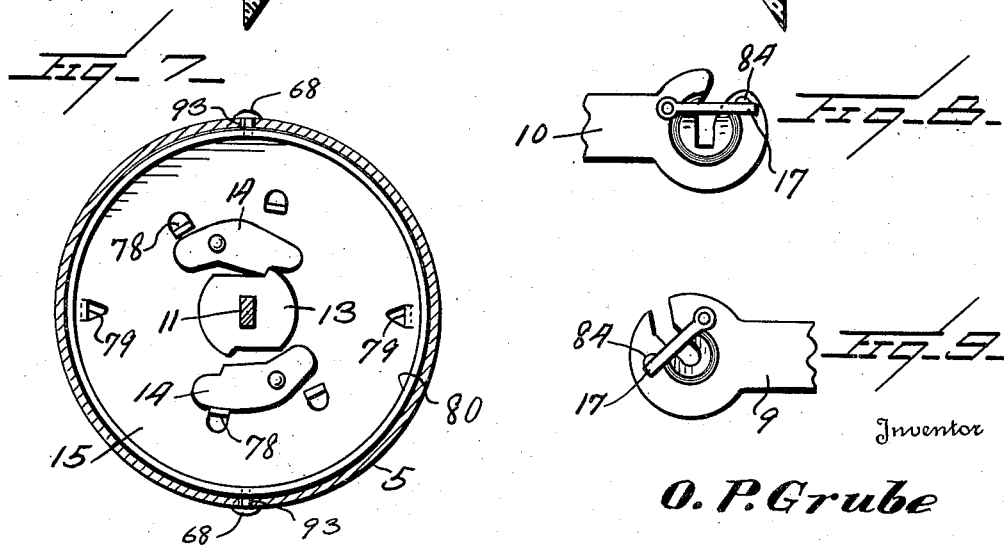
Inventor
O. P. Grube
By Watson E. Coleman
Attorney

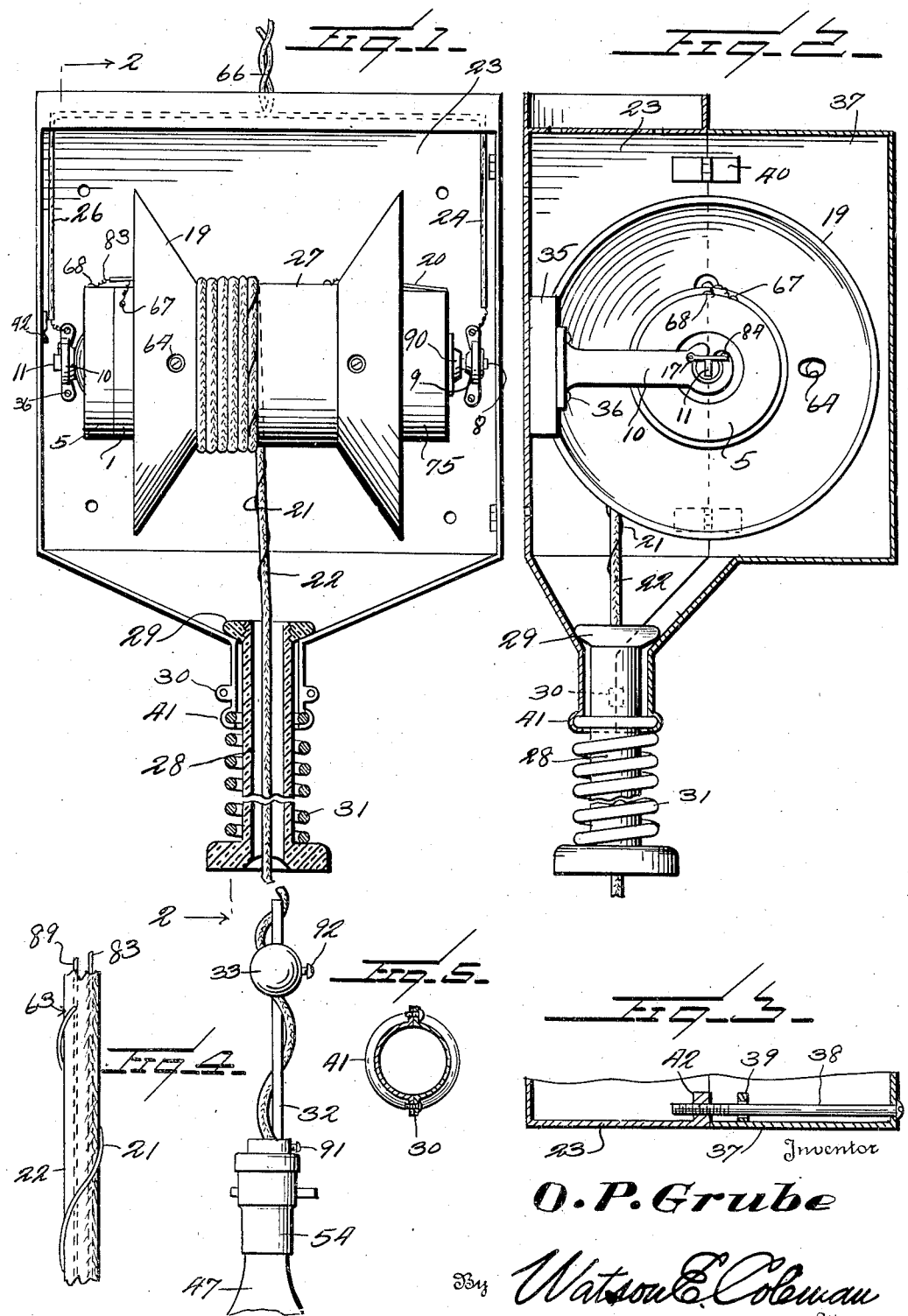

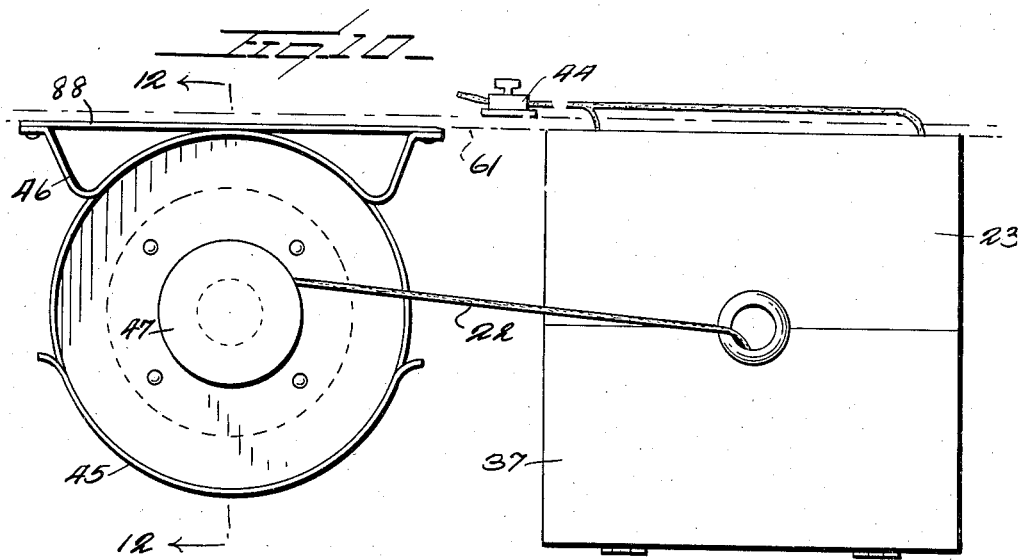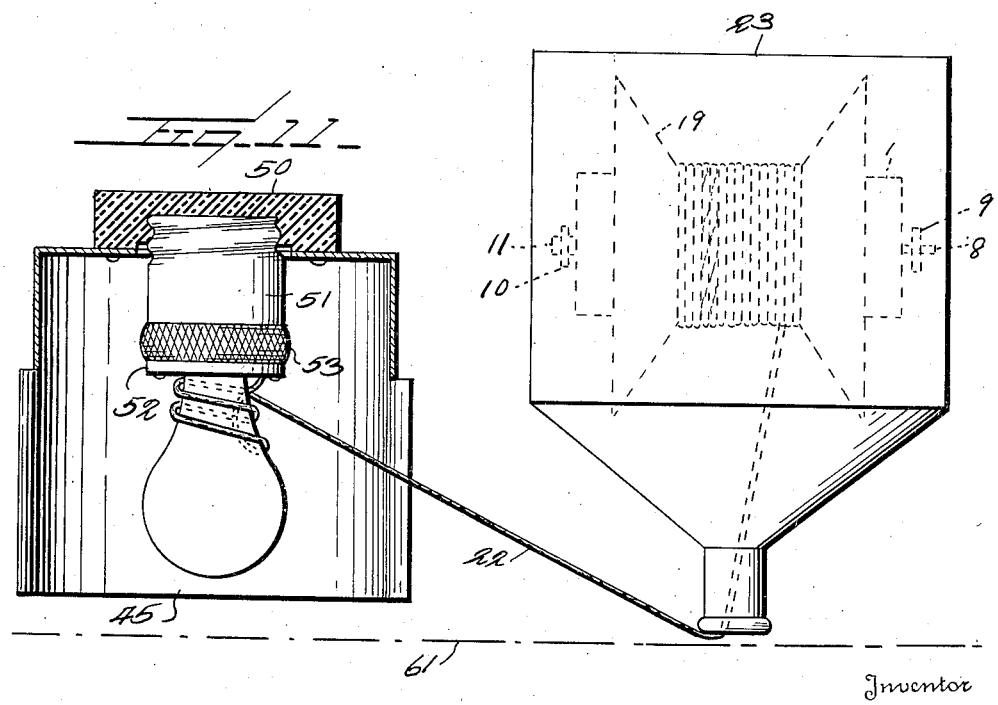

Oct. 2, 1934.  O. P. GRUBE  1,975,419
AUTOMATIC ELECTRIC EXTENSION LIGHT
Filed May 3, 1930  4 Sheets-Sheet 4
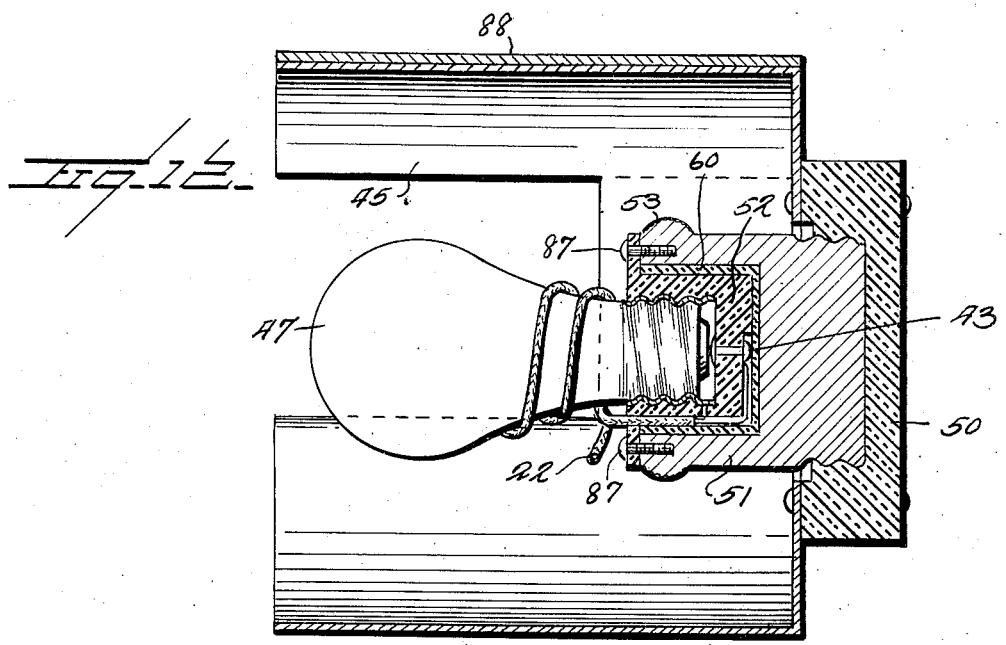
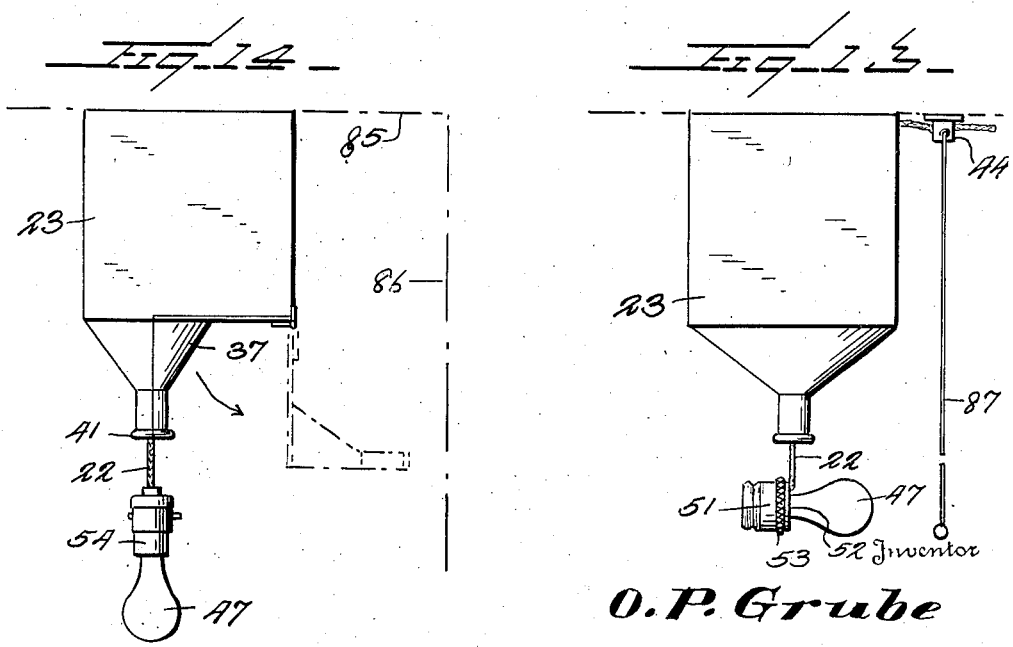
Inventor
O. P. Grube
By Watson E. Coleman
Attorney Patented Oct. 2, 1934

1,975,419

UNITED STATES PATENT OFFICE 1,975,419

AUTOMATIC ELECTRIC EXTENSION LIGHT

Owen Peter Grube, Missoula, Mont.

Application May 3, 1930, Serial No. 449,643

4 Claims. (Cl. 200—153)

This invention relates to an electric extension light and it is primarily an object of the invention to provide a device of this kind wherein the illuminating member is maintained in its fully retracted position and wherein such means serves to automatically return the illuminating member to such position after having been extended.

Another object of the invention is to provide a device of this kind comprising a housing in which is mounted a spring roller and upon which an extension line is adapted to automatically wind, together with coacting means carried by said line and the housing for limiting the extent of wind of the extension line upon the roller without undue shock to or vibration of the illuminating unit carried by the outer portion of the extension line.

A further object of the invention is to provide a device of this kind comprising a housing or the like in which is adapted to be mounted a winding drum or spool for an extension line, together with means for guiding said extension line in its movement out of or into the housing and wherein the assembly of the various parts is such to allow ready and convenient movement of the spool or drum and its associated parts from the housing as a unit whereby desired adjustment and repair is materially facilitated.

An additional object of the invention is to provide a device of this kind including in its construction or assembly a magnet whereby the illuminating unit may be readily supported from a metallic surface during the period said illuminating unit is active.

The invention consists in the details of construction and in the combination and arrangement of the several parts of my improved electric extension light whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:—

Figure 1 is a view in elevation of an electric extension light constructed in accordance with an embodiment of my invention with the closure for the container omitted and certain of the parts in section;

Figure 2 is a sectional view taken substantially on the line 2—2 of Figure 1 with the closure member applied;

Figure 3 is a fragmentary detailed sectional view of the means for holding the closure member in closed position;

Figure 4 is a fragmentary elevational view of the line or cord and the associated naked wire or contact;

Figure 5 is a view in transverse section through the upper portion of the tube 28 unapplied;

Figure 6 is an enlarged view in longitudinal section taken through the cylinder spool with certain of the parts in elevation;

Figure 7 is. a detailed sectional view taken substantially on the line 7—7 of Figure 6 with certain of the parts omitted;

Figure 8 is a fragmentary view in elevation of one of the supporting brackets for the cylinder spool;

Figure 9 is a fragmentary view in elevation of a second supporting bracket for the cylinder spool;

Figure 10 is a view in elevation and of somewhat a diagrammatic character illustrating an embodiment of the invention for installation under the dash board of an automobile;

Figure 11 is a view partly in plan and partly in section of the structure illustrated in Figure 10;

Figure 12 is an enlarged detailed sectional view taken substantially on the line 12—12 of Figure 10;

Figure 13 is an elevational view of somewhat a diagrammatic character illustrating another embodiment of my invention;

Figure 14 is an elevational view and also of a somewhat diagrammatic character illustrating a further embodiment of my invention, the open position of the closure member being indicated by broken lines.

In the embodiment of the invention as particularly illustrated in Figures 1 to 9 of the accompanying drawings, 23 denotes a housing of desired dimensions having one face open and which open face is adapted to be closed by the boxlike closure member 37, said member 37 being hingedly connected, as at 40, to the housing 23. The back wall and the top wall of the housing 23 are provided with a plurality of openings whereby the housing may be readily and effectively anchored to a ceiling, wall, post or other desired support.

An extension cord 22 is adapted to wind around the central portion of an elongated tubular member 1 of hard rubber or other material non-conductive of electricity. This member 1 at points spaced lengthwise thereof has applied thereto outwardly flaring flanges 19 whereby the central portion of the member 1 constitutes what may be termed a "spool."

The flanges 19 are provided with central hubs which snugly fit upon the member 1 and are anchored thereto in desired position by suitable screws or kindred fastening members. Access may be had to such screws by a screwdriver or kindred instrument through the opening 64 provided in each of the flanges 19. The flanges 19 are of hard rubber or other suitable material non-conductive of electricity and may be of any thickness desired.

Snugly surrounding the portion of the member 1 between the applied flanges 19 is a sleeve 27 of copper or kindred material conductive of electricity and this sleeve 27 may be anchored to the member 1 by suitably positioned and relatively small screws 65.

One of these screws 65 serves as a binding post to which is engaged an end portion of an insulated conductor 20. This conductor extends through a hole 64 in one of the flanges 19 and into a groove in the closed end of the member 1 and is in electrical connection with a bolt 8 herein disclosed as extending outwardly from the axial center of the member 1. This screw 8 also constitutes a supporting trunnion for coaction with a bracket 9 anchored to the rear wall of the housing 23 whereby an end portion of the member 1 is freely supported for rotation. The screw or trunnion 8 as well as the bracket 9 are of a material conductive of electricity and in electrical connection with said bracket 9 is a conductor 24 comprised in the cable 66. The cable 66 extends exteriorly of the housing 23 through a suitably positioned opening and is adapted to be placed in connection with a suitable source of electrical energy.

A second conductor 26 of the cable 66 leads to and is in electrical connection with a second bracket 10 which is also secured to the rear wall of the housing 23. This bracket 10 provides a mounting for the outstanding flattened trunnion 11 whereby a support is provided for the second end portion of the member 1 and around which support the member 1 is adapted to rotate as the extension line or cord 22 is unwound therefrom or wound thereon.

Arranged within and extending axially of the member 1 is a shaft 2. The inner or inserted end portion of the shaft 2 is reduced to provide a trunnion upon which is fitted a cup-shaped metal bearing 7 and which bearing 7 together with the associated trunnion of the shaft 2 are received within the bearing pocket provided in the inner face of a block 6 snugly fitted within the member 1 adjacent to its closed end. The block 6 is preferably of wood although it may be of other insulated material and is held against rotation independently of the member 1 by one or more holding screws 75 inserted through the wall of the member 1 and engaged within the applied block 6. This block 6 turns with the member 1 and around the metal bearing 7 and also, as is believed to be obvious, provides a bearing for the inserted end portion of the shaft 2. The face of the block 6 opposed to the closed end of the member 1 is provided at its central part with a depression to accommodate the head of the bolt 8 and it is preferred that this depression have disposed thereover a lamination of suitable material non-conductive of electricity.

Surrounding the shaft 2 is a coil spring 3 of desired tension, one end portion of which being suitably anchored, as at 72, to the block 6 while the opposite end portion of this spring 3 is anchored, as at 71, to a collar 4 suitably anchored to the shaft 2 so that by rotating the member 1 in one direction around the shaft 2 the spring 3 will be placed under such tension as to automatically rotate the member 1 in the opposite direction when the member 1 is free of strain or pull.

The pin 11 hereinbefore referred to is inserted within the axial center of the outer end portion of the shaft 2 and also through a bearing cap 16 fitted over and secured to the outer portion of the shaft 2. This bearing cap 16 is of a material conductive of electricity and is received within a central opening provided in a bearing plate 15 also of a material conductive of electricity. This plate 15 is disposed over the open end of the member 1 and is held thereto by the penetrating members 79 struck therefrom and which are engaged within the adjacent end face of the member 1.

The collar 4 hereinbefore referred to is positioned on the shaft 2 closely adjacent to the applied bearing cap 16 and this collar 4 is of hard rubber or other material non-conductive of electricity to eliminate the liability of the spring 3 becoming charged.

The periphery of the plate 15 is defined by an outstanding flange 80 which forms a stop for the ferrule 5 when screwed onto the open end portion of the member 1 whereby the applied ferrule 5 holds the plate 15 and parts associated therewith in effective position. The flange of the ferrule 5 is provided with a suitable slot 93 through which the screw 68 is inserted for direct engagement with the flange 80 of the plate 15.

Mounted in desired position upon the outer face of the plate 15 are the swinging dogs 14 for coaction with the ratchet member 13 mounted upon the pin 11. The extent of swinging movement of each of the dogs 14 in either direction is limited by the outstanding lugs 78 struck from the plate 15 and properly positioned fore and aft of the pivotal mounting of the dog.

Each of the brackets 9 and 10 has pivotally connected thereto adjacent the entrance to the opening or slot therein an elongated spring member 17 for engagement behind a lug 84 extending from said bracket whereby the applied member 1 or spool structure is effectively held from jumping out of either of the brackets. Each of these brackets 9 and 10 is secured by the bolts 36 or the like upon a block 35 of rubber or other material non-conductive of electricity. This block 35 is anchored in any desired manner to the rear wall of the housing 23. The closure member 37, as herein disclosed, carries a long screw 38 adapted to be engaged with a post 42 carried by a side wall of the housing 23 adjacent its open face and also through a guide post 39 carried by a side wall of the closure member 37 adjacent its open face. With the bolt 38 engaged with the post 42 the closure member 37 will be effectively locked in closed position. As is clearly illustrated in Figure 3 this bolt 38 extends exteriorly of the closure member so that it can be readily operated from without.

The extension cord 22 after leaving the spool passes out of the housing 23 through a tube 28 of hard rubber or other material non-conductive of electricity and which tube is held by a semi-circular neck leading from the lower portion of housing 23. Threaded upon the end portion of the tube 28 within the housing 23 is a holding rim or flange 29 whereby the outward movement of the rim or flange is limited.

The cord 22 comprises in its structure two conductors, one of which as 83 being in connection with the screw 68 hereinbefore referred to while the second conductor 89 has a dead end connected to the member 1 as at 67. At a desired point indicated at 63 from the inner or connected end of the line or cord 22 the conductor 89 has in electrical connection therewith an elongated naked wire 21 of desired length and which, as the cord or line 22 initially winds upon the spool, will have electrical contact with the sleeve 27. The location of this naked wire or contact, however, is such that before the cord 22 is fully unwound from the spool this naked wire or contact will pass out of electrical engagement with the sleeve 27, thus breaking the electrical circuit so that the illuminating unit or other translation element to which the cord 22 leads will become ineffective or inoperative thereby giving warning to the individual that no further pull should be given to the cord 22 which would otherwise have a tendency to injure the device. It is desired that the naked wire or contact 21 be of a length equal to substantially two laps or convolutions of the cord 22 around the spool.

This wire or contact 21 is also preferably wound around the cord or line 22 in relatively long spirals and may be readily held against flapping or other displacement through the instrumentality of conventional tape.

The outer end portion of the member or tube 28 is enlarged to provide a head and bearing against said head is an end portion of an expansion bumper spring 31 of requisite tension. The opposite or inner end portion of this spring 31 has a convolution snugly engaged within an inwardly facing groove or socket 41 provided in the outer end portion of the neck depending from the housing 23. The spring 31 serves to constantly urge the tube 28 outwardly yet permits the same to have inward yielding movement as will hereinafter more particularly be referred to. The tube 28 is of a length to provide effective insulation for the naked wire or contact 21 as the same is withdrawn from the spiral.

In this embodiment of my invention the cord or line 22 leads to the socket 54 of a conventional electric bulb light through a rubber collar 34 which is extended within the socket 54 of the lamp 47. The collar 34 is held in position by a holding screw 91 or the equivalent. A portion of the cord 22 for a desired distance and immediately adjacent to the lamp 47 or more particularly the socket 54, is wrapped or coiled around an elongated and relatively rigid member 32 which, as the cord 22 is wound upon the spool, enters the tube 28 until the bumper 33 mounted upon the member 32 comes into contact with the outer end of the tube 28. This bumper 33 is adapted to be selectively adjusted along the member 32 and maintained in such selected adjustment by a holding screw 92.

As the bumper 33 comes into contact with the outer end of the tube 28 said tube will have sufficient inward yielding movement as a result of the force or impact to absorb any undesirable shock which would otherwise probably occur.

The closure member 37 is also provided with a depending neck substantially semi-circular in cross section and which, when the closure member is closed, registers with the neck of the housing. This depending neck of the closure member is also provided with an inwardly facing groove or socket to tightly receive the upper convolution of the spring 31 to further maintain said spring in applied position. These depending necks of the housing 23 and closure member 37 when in register are adapted to be effectively maintained in such relation by screws or the like directed through outstanding ears carried by said necks as particularly indicated at 30 in the accompanying drawings.

The screw 8 is held in position by a nut 18 threaded thereon and coacting with the adjacent outer face of the closed end of the tubular member 1. This nut 18 has disposed thereover a disk washer 90 secured to said closed end of the member 1 in order to eliminate the loosening of said nut 18 as a result of the rotation of the member 1.

The pin 11 is preferably held in applied position with respect to the shaft 2 by a member 70 disposed radially through the shaft 2 and which member also provides means for keying the bearing cap 16 to the shaft.

It is believed to be obvious that in mounting the device the arrangement is such that the closure member 37 will swing in a direction away from the support to which the housing is secured when the closure member is being moved into one position.

In Figure 14 I illustrate diagrammatically the housing 23 arranged with relation to the ceiling 85 and the side walls 86 of a room and in this figure I show diagrammatically the closure member 37 in both an open and a closed position, the direction of travel of the closure member 37 when being opened being indicated by an arrow.

In the embodiment of the invention as illustrated in Figures 10 to 14 the housing 23 is arranged in position with respect to the dash board of an automobile to allow the extension cord or line 22 to be delivered toward the seat and up over the dash board 61. The closure member 37 opens downward and the mechanism within the housing 23 is substantially the same as that hereinbefore described in detail. In this arrangement the light socket has no switch but a suitable switch 44 is arranged in the circuit for the lamp and preferably positioned on the dash board. In this form of my invention the light socket comprises a hard rubber body 52 containing two contacts with which the conductors of the cord 22 are engaged through the medium of the screws 43 which are protected by a rubber cap 60.

The socket 52 is inserted within a magnet 51 which consists of a solid piece of magnetized metal which is adapted to be threaded into a hard rubber block 50 to which is threaded a light shield 45. The socket is secured to the magnet 51 by the screws 87 or the like.

As particularly illustrated in Figure 11, the light shield is circular in form and fastened to a flat plate 88 which is adapted to be secured to the under side of the dash board. The joining of the light shield and the plate 88 is made more secure by the brackets 46 which run the full length of the shield. This shield is of a size to permit the desired insertion of a hand over the lamp 47 so that the magnet 51 may be readily disengaged from the block 50. To facilitate this release of the magnet 51 it is provided with the outstanding surrounding roughened rib 53. The magnet 15 provides means whereby the lamp may be conveniently held in desired position particularly when the selected supporting surface is of metal.

When not in use the magnet 51 does not come into contact with any metal except the small screws 87 thus assuring a safe way to carry the magnet so it will not lose its power. When the magnet with the lamp 47 attached is screwed to the block 50 the extension cord 22 automatically winds around a globe or bulb of the lamp 47 and takes the strain off of the cord 22 where it enters the light socket. The spring operated spool within the housing will keep the cord tight at all times.

As is particularly illustrated in Figure 10, it is to be noted that the arrangement of parts in this embodiment of my invention is such to fit up under and just come flush with the edge of the dash board.

As illustrated in Figure 13 the magnet 51 need not be engaged with a holding block 50 but may be allowed to hang suspended from the extension cord 22 when not in use. The controlling switch 44 placed out of reach may be worked by a cord or chain 87.

From the foregoing description it is thought to be obvious that an electric extension light constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

1. A device of the class described comprising a take-up spool, a cord winding on said spool including electrical conductors insulated one from the other, one of said conductors having a dead end, an elongated contact carried exteriorly of the end portion of the cord winding upon the spool, said elongated contact being electrically connected with the dead ended conductor, said contact also terminating a distance inwardly of the extremity of the cord winding upon the spool, a contact sleeve carried by the spool and with which the exposed contact engages when wound upon the spool, the second conductor of the cord and the sleeve being interposed in a translation circuit, the exterior elongated contact being spaced from the extremity of the conductor winding on the spool a distance sufficient to allow materially additional unwinding of the cord after the exterior contact has passed off from the spool to break the translation circuit before the cord is entirely unwound from the spool.

2. A device of the class described comprising a take-up spool, a cord winding on said spool including electrical conductors insulated one from the other, one of said conductors having a dead end, an elongated contact carried exteriorly of the end portion of the cord winding upon the spool, said elongated contact being electrically connected with the dead ended conductor, said contact also terminating a distance inwardly of the extremity of the cord winding upon the spool, a contact sleeve carried by the spool and with which the exposed contact engages when wound upon the spool, the second conductor of the cord and the sleeve being interposed in a translation circuit, the exterior elongated contact being spaced from the extremity of the conductor winding on the spool a distance sufficient to allow materially additional unwinding of the cord after the exterior contact has passed off from the spool to break the translation circuit before the cord is entirely unwound from the spool, and a tubular guide for the cord as it leaves the spool, said guide being of a material non-conductive of electricity and housing the exterior contact of the cord when unwound from the spool.

3. A device of the class described comprising a take-up spool, a cord winding on said spool and including conductors interposed in a translation circuit, a tubular guide for the cord as it leaves the spool, means for supporting said guide for endwise movement, an electric fixture through which the conductors of the cord are connected, an elongated and relatively rigid member carried by the fixture and entering the tubular guide when the cord is fully wound upon the spool, and a bumper mounted on said member for contact with the outer end of the guide to limit the winding of the cord.

4. A device of the class described comprising a take-up spool, a cord winding on said spool and including conductors interposed in a translation circuit, a tubular guide for the cord as it leaves the spool, means for supporting said guide for endwise movement, an electric fixture through which the conductors of the cord are connected, an elongated and relatively rigid member carried by the fixture and entering the tubular guide when the cord is fully wound upon the spool, a bumper mounted on said member for contact with the outer end of the guide to limit the winding of the cord, and yieldable means for resisting endwise movement of the tubular guide under the action of the bumper.

OWEN PETER GRUBE.